United States Patent [19]
Heestand et al.

[11] Patent Number: 5,769,123
[45] Date of Patent: Jun. 23, 1998

[54] CYLINDER ACTUATED DESCALE VALVE

[75] Inventors: Mickey C. Heestand, Salem; James M. Glasser, Leetonia, both of Ohio

[73] Assignee: Hunt Valve Company Inc., Salem, Ohio

[21] Appl. No.: 807,893

[22] Filed: Feb. 26, 1997

[51] Int. Cl.$^6$ .................................................. F16K 1/52
[52] U.S. Cl. ................................. 137/625.38; 251/282
[58] Field of Search ........................... 137/625.3, 625.38; 251/282

[56] References Cited

U.S. PATENT DOCUMENTS

| | | |
|---|---|---|
| 2,981,287 | 4/1961 | Caslow . |
| 3,086,553 | 4/1963 | Levine . |
| 3,964,516 | 6/1976 | Purton et al. ................... 137/625.38 |
| 4,167,262 | 9/1979 | Lemmon . |
| 4,374,582 | 2/1983 | Heyneman . |
| 4,809,746 | 3/1989 | Wolfges . |
| 4,852,364 | 8/1989 | Seener, et al. . |
| 4,921,209 | 5/1990 | Moineau . |
| 5,069,246 | 12/1991 | Boovens . |
| 5,074,519 | 12/1991 | Pettus ......................... 137/625.38 X |
| 5,248,123 | 9/1993 | Richeson et al. . |
| 5,439,030 | 8/1995 | Pallaruelo . |
| 5,503,365 | 4/1996 | Backe . |

Primary Examiner—John Fox
Attorney, Agent, or Firm—Frederic E. Naragon

[57] ABSTRACT

A valve to control fluid of high volume and pressure comprising a continuously balanced hollow plunger disposed within an annularly enlarged chamber that controls fluid flow by moving radial slots and ports in its peripheral wall back and forth across seals, the plunger being continuously balanced in any position by a double-rodded piston assembly comprising a piston, a ported operator rod and actuator rod, and a balance chamber within a sealed piston cylinder tube that allows the line media to flow through, out of, and around the plunger, through the operator rod and through and out of the actuator rod and into the balance chamber creating a complete continuous balancing effect on the plunger in any position, and operator means are only required to overcome seal friction and path resistance to move the plunger to selected position.

3 Claims, 5 Drawing Sheets

CYLINDER ACTUATED DESCALE VALVE

The present invention relates generally to a cylinder actuated descale valve which employs a hollow slidable valve plunger to control flow between an inlet port and an outlet port. The valve plunger is caused to reciprocate in the valve casing or housing by use of a piston cylinder assembly and operating means. The plunger is continually balanced by the process fluid which flows through the plunger through a passage port of an operator rod to a balance chamber formed in the piston assembly. The piston cylinder assembly comprises a piston, actuator rod, operator rod with a passage port, and a balance chamber formed within a cylindrical tube. The operator rod and actuator rod are actually formed from one rod with a larger diameter at one end comprising the operator rod with a through port provided and a smaller diameter at the other end which comprises the actuator rod and which is solid except for a slight penetration of the through port past the juncture of the change of diameters of the rod and radial ports which cooperate with the through port giving the appearance of a double rodded piston assembly. The sizes of the piston, the actuator rod, and the operating rod are selected so that the forces caused by the process fluid on each side of the plunger will be continually balanced, thus insuring that the valve plunger will be easier to move between the open and closed positions. The valve of the present invention is adapted to primarily control water flow of high volume and high pressure and primarily for use in steel mills as a main control of high pressure water sprays that descale hot steel bar, slab, plate, and sheets in the rolling mill process. The valve plunger is a hollow cylinder and has a reduced flow path within it and when the valve is in the open position the plunger body will not generate turbulent flow as is the case in the prior art. The balance chamber of the invention results in less pressure within the valve and greater efficiency. In addition, the valve provides for an improved seal which is not double acting and provides superior seal contact in the direction required and a reduction of seal friction and extrusion draft resistance, and thus, longer life.

The prior art discloses patents for various valves and improvements to valves and some of the patents are listed as follows:

| U.S. patent 2,981,287 - | J. H. Caslow | April 25, 1961 |
|---|---|---|
| U.S. patent 3,086,553 - | G. A. Levine | April 23, 1963 |
| U.S. patent 4,167,262 - | John C. Lemmon | September 11, 1979 |
| U.S. patent 4,374,582 - | Guido Heyneman | February 22, 1983 |
| U.S. patent 4,809,746 - | Hans Wolfges | March 7, 1989 |
| U.S. patent 4,852,364 - | G. Thomas Seener, et al. | August 1, 1989 |
| U.S. patent 4,921,209 - | Hubert J. Moineau | May 1, 1990 |
| U.S. patent 5,069,246 - | Andries M. Booyens | December 3, 1991 |
| U.S. patent 5,248,123 - | William E. Richeson, et al. | September 28, 1993 |
| U.S. patent 5,439,030 - | Sebastian Cazcarra Pallaruelo | August 8, 1995 |
| U.S. patent 5,503,365 - | Wolfgang Backe | April 2, 1996 |

U.S. Pat. No. 2,981,287 issued to J. H. Caslow on Apr. 25, 1961, pertains to a valve for the control of hydraulic fluid preferably oil and to extend and retract a cylinder actuator. This invention could serve as the pilot valve i.e. operating means for the present invention with a hydraulic operator. This invention does not teach of a valve that opens or closes the flow of water to a downstream device, does not teach of positive seals to prevent internal leakage, does not provide for a hollow valve plunger and does not provide for a double-rodded piston assembly balancing the process fluid forces on each side of the valve as is provided in the present invention.

U.S. Pat. No. 3,086,553 issued to G. A. Levine on Apr. 23, 1963, discloses a two-stage, two-fluid unidirectional flow control valve for metering flow of fluid and does not teach of a double-rodded piston cylinder arrangement with a balance chamber, and hollow plunger or positive seal as is provided in the present invention.

U.S. Pat. No. 4,167,262 issued to John C. Lemmon on Sep. 11, 1979, discloses a descale valve with a hollow plunger which moves radial slots across a seal and utilizes double-acting seals to isolate a downstream port but does not provide means for balancing the hollow plunger or a double-rodded piston cylinder arrangement reducing turbulence when the valve is in its open position and/or a balance chamber to reduce pressure in the valve and providing for greater efficiency and operation as is provided in the present invention. The present invention is primarily an improvement to the valve disclosed in the Lemon patent and was developed for the same employer and owner of the Lemon patent.

U.S. Pat. No. 4,374,582 issued to Guido Heyneman on Feb. 22, 1983, pertains to a valve that has flat sliding plates that communicate the flow passages using air actuation and a double-headed piston which requires constant biasing and which moves a slide member to open and close a port. The invention does not teach of a double-rodded piston cylinder arrangement which does not require constant biasing and is balanced by the total system pressure and does not teach of a hollow plunger or an improved seal design and arrangement as is provided in the present invention.

U.S. Pat. No. 4,809,746 issued to Hans Wolfges on Mar. 7, 1989, describes a proportional throttle valve in which the position of the valve member remains constant independent of up-stream and downstream pressure fluctuations and is of proportional control. This invention does not teach of a hollow plunger, a double-rodded piston cylinder arrangement with a balance chamber for balancing the entire system and reducing shift force and allowing for full stroke shifting for on and off control and does not teach of an improved positive elastomeric seal as is provided in the present invention.

U.S. Pat. 4,852,364 issued to G. Thomas Seener, et al. on Aug. 1, 1989, teaches of a valve assembly in which a stem and a guide member move a check valve to open and close inlets and outlets and in conjunction with an apertured spring retainer to balance and reverse refrigerant flow. The invention does not teach of a hollow plunger or a double-rodded piston cylinder arrangement with a balance chamber to provide continuous balancing of a hollow plunger and a positive elastomeric seal as is provided in the present invention.

U.S. Pat. No. 4,921,209 issued to Hubert J. Moineau on May 1, 1990, discloses a celluloid-operated valve to control water flow for bathing and comprises a piston having a flow groove passage with no seals where the piston flows along the groove passage to open and close inlet and outlet ports. The invention does not disclose a hollow plunger, elastomeric seals for a positive shutoff within the valve or a balanced double-rodded piston cylinder arrangement with a balance chamber as is provided in the present invention.

U.S. Pat. No. 5,069,246 issued to Andries M. Booyens on Dec. 3, 1991, pertains to a check valve with an internal cylinder and a double rod configuration to increase the force on the check area by venting the internal area to shift the valve open and closed. The invention does not teach of a balanced double-rodded piston cylinder arrangement, improved positive peripheral seal or a hollow plunger as is provided in the present invention.

U.S. Pat. No. 5,248,123 issued to William Richeson, et al. on Sep. 28, 1993, teaches of a hydraulic activated poppet-type valve primarily for internal combustion engine application with a metal to metal cone type seating and a biasing spring to stabilize pressure within the valve. The invention does not teach of a sliding hollow plunger, balanced double-rodded piston cylinder arrangement or a positive seal as is provided in the present invention.

In U.S. Pat. No. 5,439,030 issued to Sebastian Cazcarra Pallaruelo on Aug. 8, 1995, there is shown a valve assembly comprising a plug in a cylinder which is balanced for high pressure drops and the sizes of various chambers are calculated so that the plug will remain balanced. The invention is primarily for a reducing valve for modulation of pressure drop with balanced diameter features of the metering plug to prevent the valve from becoming unstable or making noise. The operator rod of the invention is a vertical load which is not balanced. The invention does not teach of a completely balanced-double rodded piston cylinder arrangement with balance chamber, positive seal or hollow plunger for on and off control as is provided in the present invention.

U.S. Pat. No. 5,503,365 issued to Wolfgang Backe on Apr. 2, 1996, shows a valve having a tubular piston which operates to maintain flow equilibrium between inflow and outflow or a celluloid employed to control the pressure proportionately and does not teach of a completely balanced double-rodded piston cylinder arrangement, positive seal and sliding hollow plunger as is provided in the present invention.

All of the aforesaid prior art discloses valves which function at pressure ranges not exceeding 3,000 P.S.I., whereas, the present invention will operate at a pressure up to 6,000 P.S.I.

DETAILED DESCRIPTION OF THE DRAWINGS

Reference is now made to the drawings wherein the present invention is illustrated in detail and wherein similar components bear the same reference numeral throughout the several views.

Figure 1:
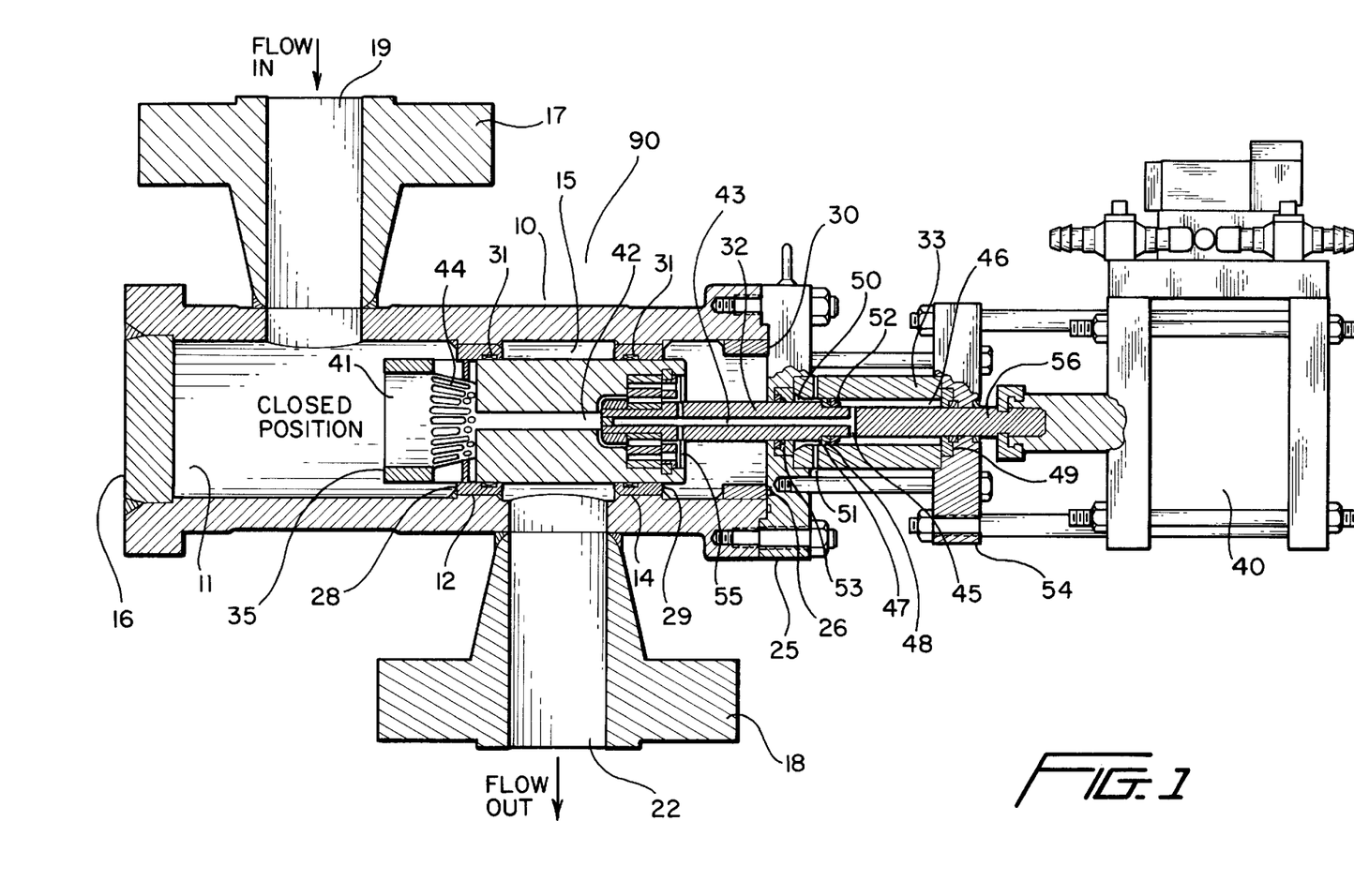
FIG. 1 is a cross-sectional view of the entire invention with the plunger in a closed position.

FIG. 1 is a cross-sectional view of the entire invention 90 with the plunger 35 and further illustrates the valve housing 10, longitudinal opening 11, annular land 12, annular land 14, annularly enlarged chamber 15, disc 16, inlet flange 17, outlet flange 18, inlet port 19, outlet port 22, housing closure plate 25, o-ring seal 26, seal ring 28, seal ring 29, high pressure seal ring 30, high pressure seal 31, operator rod 32, plunger 35, operator means 40, plunger flow opening 41, plunger passage port 42, operator rod passage port 43, plunger flow slots and ports 44, radial actuator rod port 45, balance chamber 46, piston 47, piston seal 48, actuator rod seal 49, vent chamber 50, vent port 51, retaining nut 52, housing closure plate seal 53, cylinder closure plate 54, operator rod radial port 55, and actuator rod 56.

Figure 2:
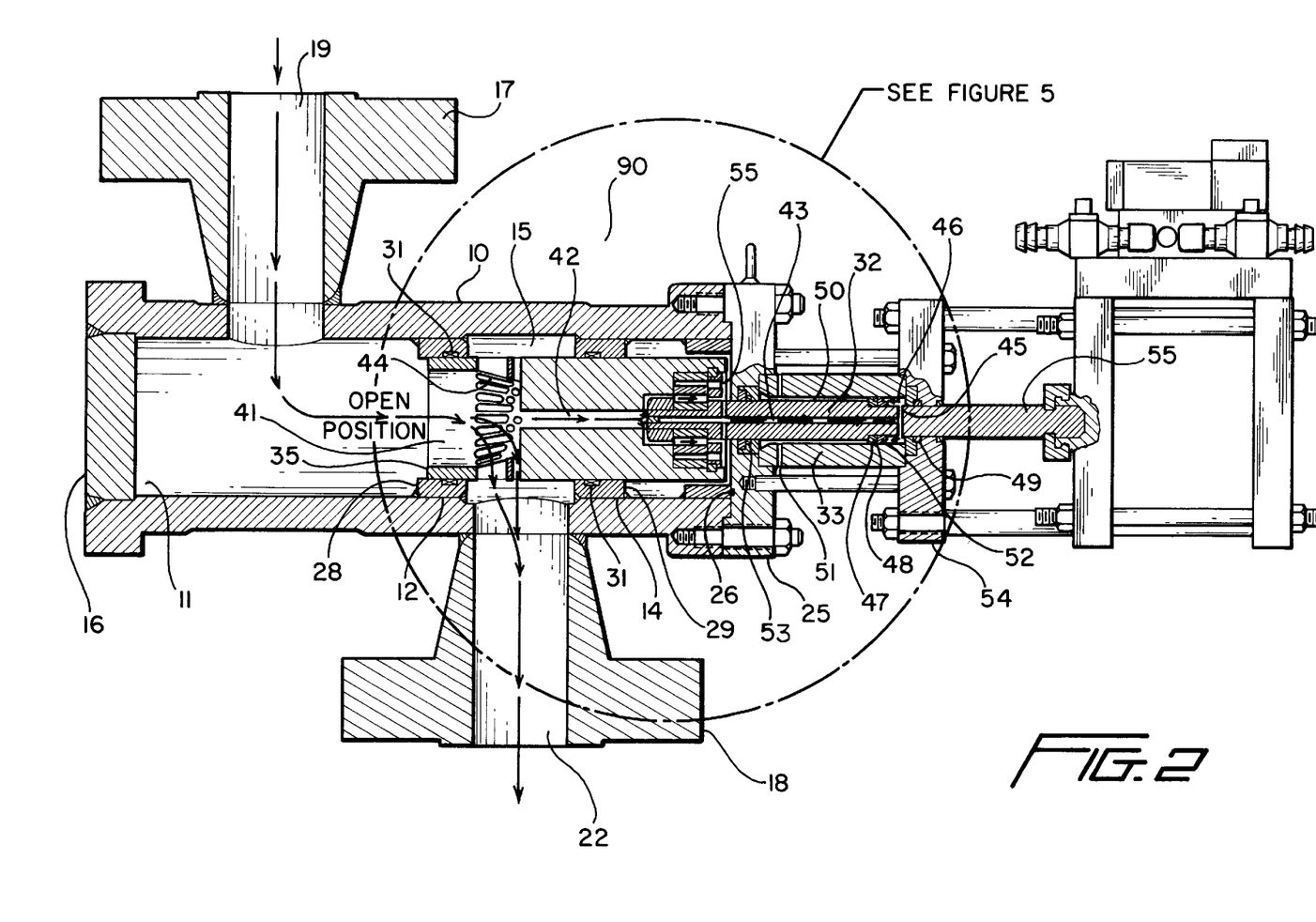
FIG. 2 is a cross-sectional view of the entire invention with the plunger in an open position.

FIG. 2 is a cross-sectional view of the entire invention 90 with the plunger 35 in an open position and further illustrates the valve housing 10, longitudinal opening 11, annular land 12, annular land 14, annularly enlarged chamber 15, disc 16, inlet flange 17, outlet flange 18, inlet port 19, outlet port 22, housing closure plate 25, o-ring seal 26, seal ring 28, seal ring 29, high pressure seal ring 30, high pressure seal 31, operator rod 32, plunger 35, operator means 40, plunger flow opening 41, plunger passage port 42, operator rod passage port 43, plunger flow slots and ports 44, radial actuator rod port 45, balance chamber 46, piston 47, piston seal 48, actuator rod seal 49, vent chamber 50, vent port 51, retaining nut 52, housing closure plate seal 53, cylinder closure plate 54, operator rod radial port 55, and actuator rod 56.

Figure 3:
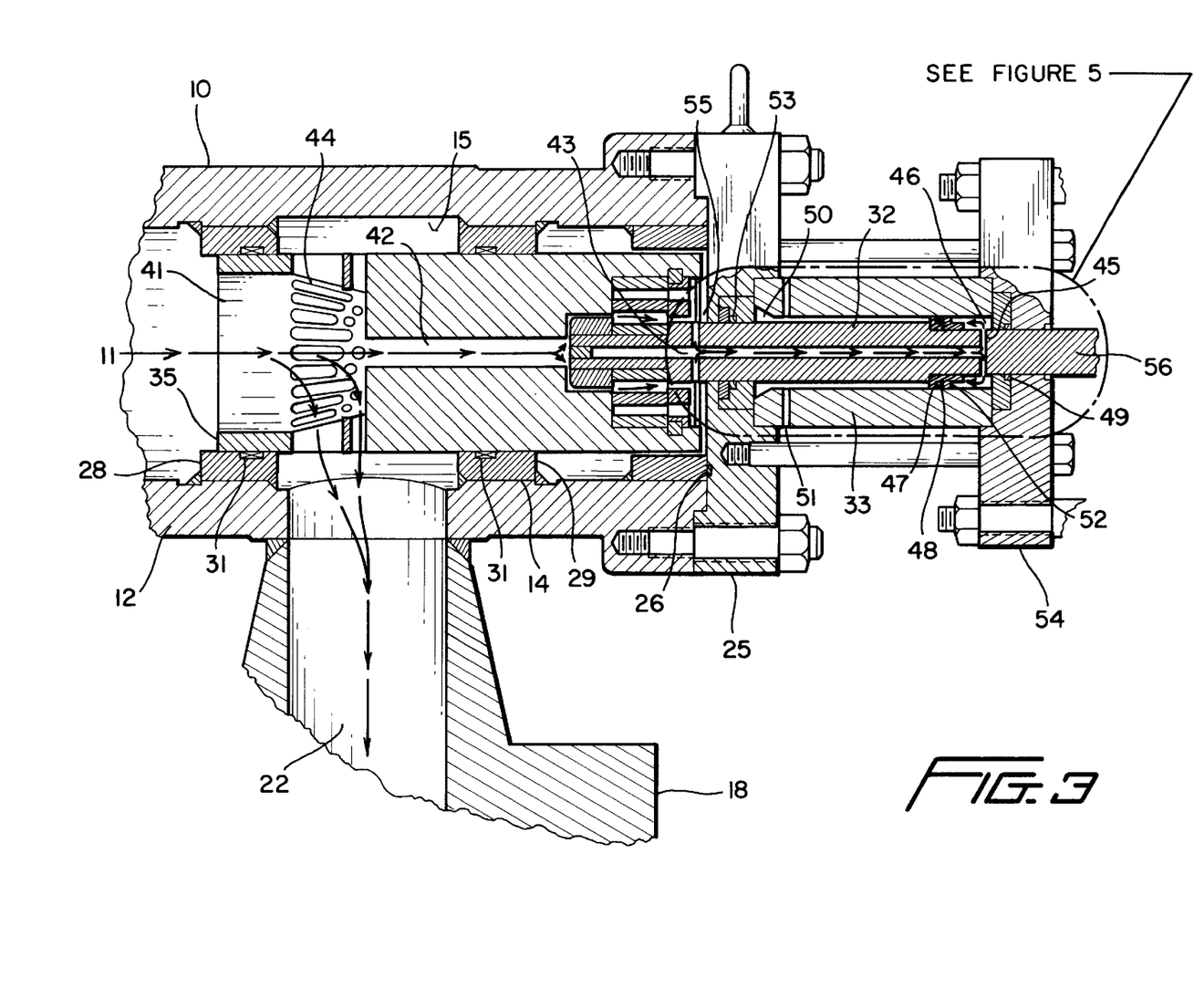
FIG. 3 is an enlarged cross-sectional view from FIG. 2 of a portion of the valve housing and the piston cylinder tube with the plunger in an open position.

FIG. 3 is an enlarged cross-sectional view from FIG. 2 of a portion of the valve housing 10 and the piston cylinder tube 33 with the plunger 35 in an open position and further illustrates valve housing 10, longitudinal opening 11, annular land 12, annular land 14, annularly enlarged chamber 15, outlet flange 18, outlet port 22, housing closure plate 25, o-ring seal 26, seal ring 28, seal ring 29, high pressure seals 31, piston cylinder tube 33, plunger 35, plunger flow opening 41, plunger passage port 42, operator rod passage port 43, plunger flow slots and ports 44, radial actuator rod port 45, balance chamber 46, piston 47, piston seal 48, actuator rod seal 49, vent chamber 50, vent port 51, retaining nut 52, housing closure plate seal 53, cylinder closure plate 54, operator rod radial port 55, and actuator rod 56.

Figure 4:
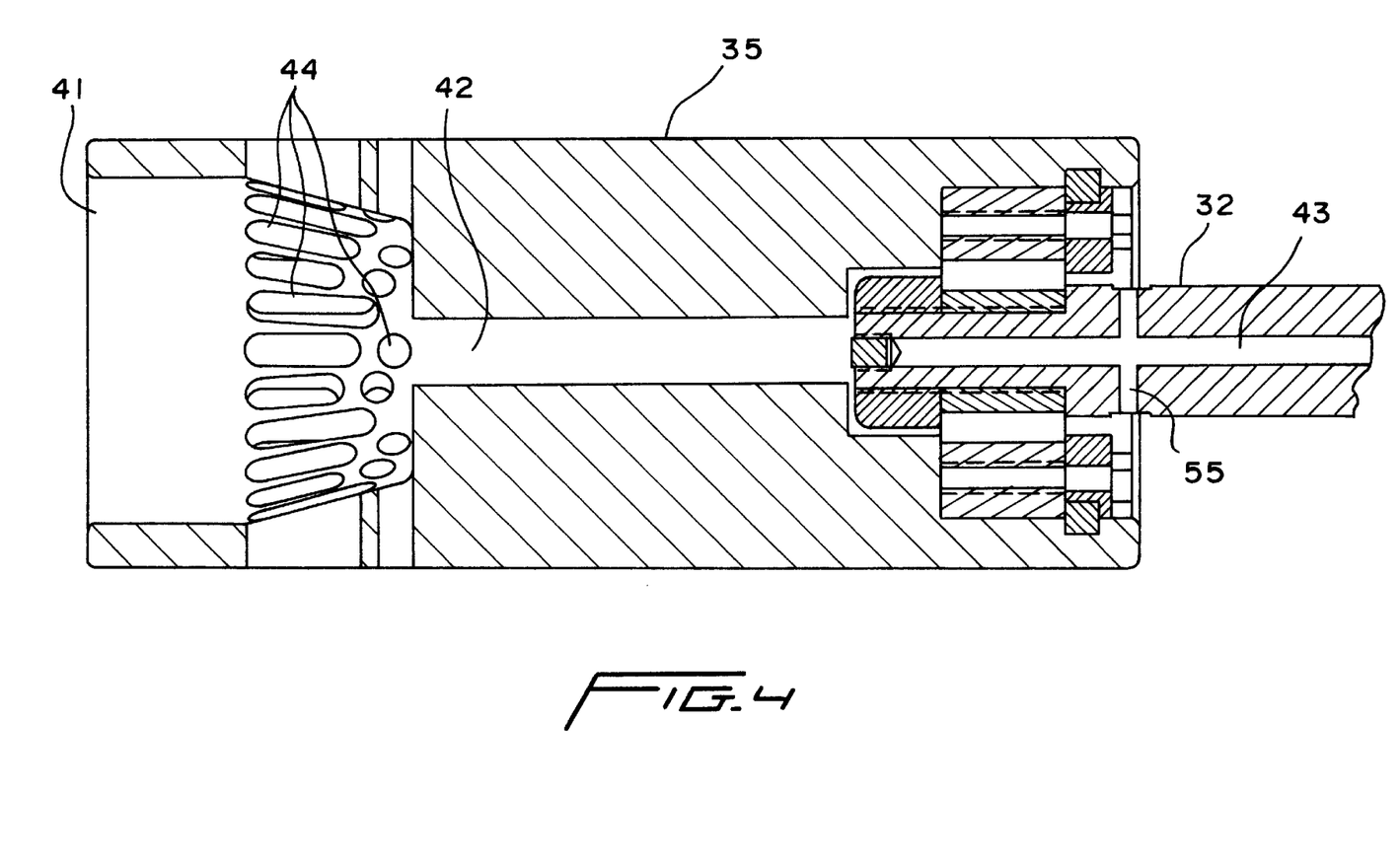
FIG. 4 is a cross-sectional view of the plunger and a portion of the operator rod.

FIG. 4 is a cross-sectional view of the plunger 35 and a portion of the operator rod 32 and further illustrates plunger flow opening 41, plunger passage port 42, operator rod passage port 43, plunger flow slots and ports 44, operator rod radial port 55, and actuator rod 56.

Figure 5:
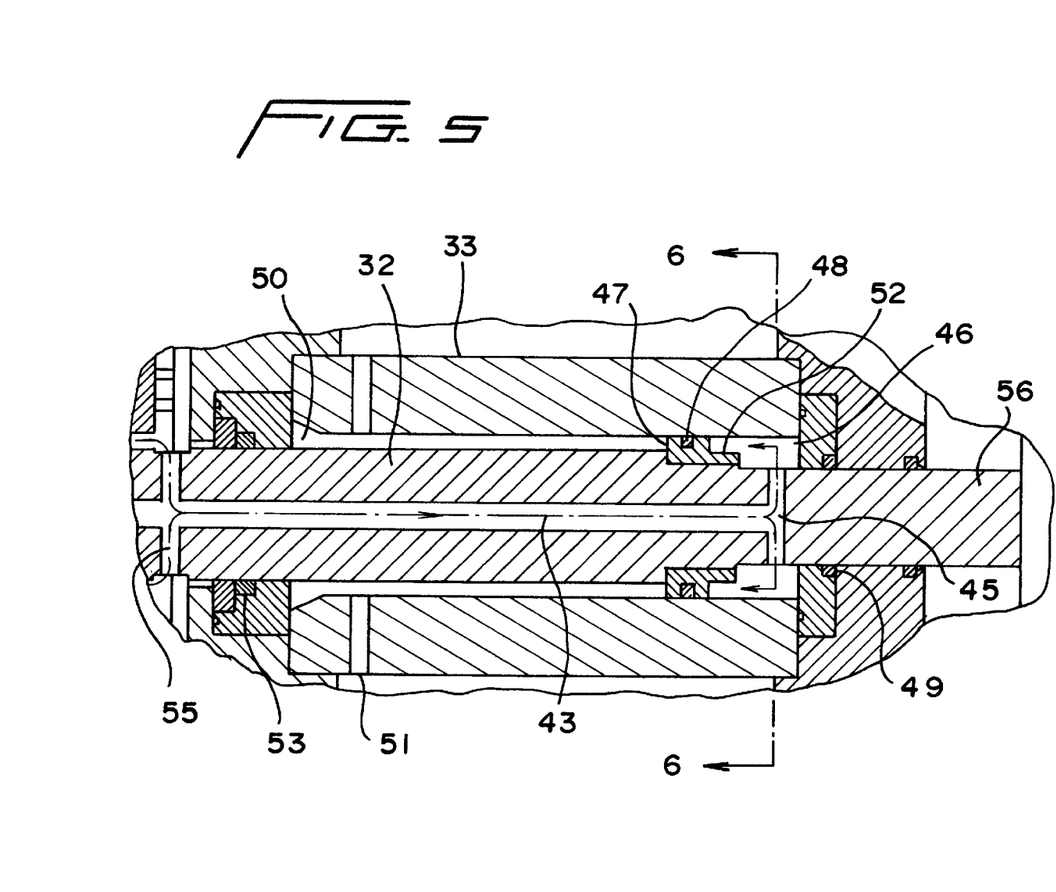
FIG. 5 is an enlarged cross-sectional view of the piston cylinder tube and a portion of the actuator rod.

FIG. 5 is an enlarged cross-sectional view of the piston cylinder tube 33 and the actuator rod 56 and further illustrates operator rod 32, piston cylinder tube 33, operator rod passage port 43, balance chamber 46, piston 47, piston seal 48, actuator rod seal 49, vent chamber 50, vent port 51, retaining nut 52, housing closure plate seal 53, operator rod radial port 55, and actuator rod 56.

Figure 6:
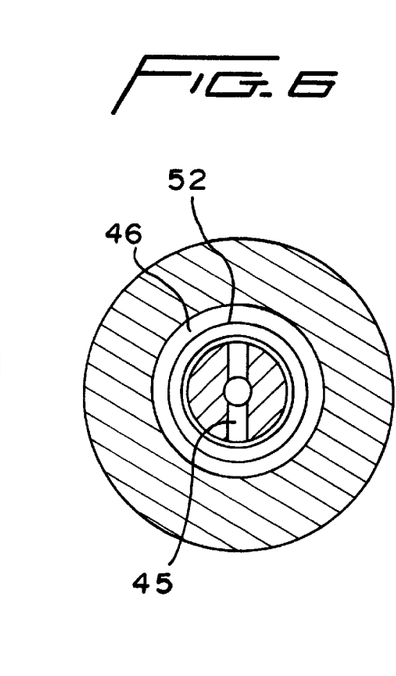
FIG. 6 is an end view along line A—A of FIG. 5.

FIG. 6 is an end view along line A—A of FIG. 5 and further illustrates operator rod 32, radial actuator rod port 45, balance chamber 46, and retaining nut 52.

DESCRIPTION OF THE PREFERRED EMBODIMENT

Referring to FIGS. 1 through 6 the preferred embodiment of the present invention comprises a cylinder actuated descale valve adapted primarily to control the flow of water under high pressure, typically in the range of 3,000–6,000 P.S.I., to descale hot steel sheets in a steel rolling mill process. The present invention in preferred form comprises a metal valve body or housing which may be formed as a casting or part casting and part fabrication. The body has a longitudinal opening there through with a pair of machined annular lands between an annularly enlarged chamber. One end (the left end as viewed in FIGS. 1 and 2) of the housing is closed by a metal disc to seal this end opening. Inlet and outlet flanges are connected to the body (on top and bottom respectively as shown in FIGS. 1 and 2) the inlet flange has an inlet port adapted to be connected to a source of liquid under pressure such as an accumulator and pump and the inlet port communicates with the body opening (at the left-hand side of the body as shown in FIGS. 1 and 2). The outlet flange has an outlet port adapted to be connected to any desired apparatus, such as high pressure water sprays employed in rolling mills and the outlet port communicates with and is centered within the annularly enlarged chamber within the valve body. The opposite end (right-hand end as seen in FIGS. 1 and 2) of the housing is closed by a closure plate which is secured to the valve body and which is bored through to slidably accept and cooperate with an operator rod. A high pressure seal ring and o-ring seal are disposed within the housing at the closure plate to the seal the closure plate end of the housing. The high pressure seal ring is machined from 304 stainless steel. The o-ring seal is not novel and is a commercially available item such as ARP #433 90 dorometer viton.

A slidable plunger is positioned for axial reciprocation within the annularly enlarged chamber in the valve housing opening and cooperates with the outlet port and comprises a hollow metal cylinder wherein the external surface of the plunger has a very slight operating clearance with the machined inter-diameter of the housing and a pair of seal rings and a pair of high pressure seals are disposed between the plunger and inter-diameter of the housing at the outlet port so that the plunger slides freely over the outlet port with the seal rings and seals sealing against fluid passages in both directions. The seal rings and seals act as bearings to prevent metal to metal contact and also act as wipers to keep away contaminates and both the seal rings and seals are commercially available kit items such as Parker Packing #FS-11275, Parker Packing #FS-11276, and Parker Packing #FS-11277 for 4", 6", and 8" valves, respectively. 4, 6, and 8 refer to the standard pipe size flanges used.

The plunger is shifted axially by the operator engaging an actuator rod hydraulic cylinder or mechanical type screw/hand wheel mechanism or other operating means which provides the necessary force to overcome the seal friction and flow path resistance and move the plunger from closed balanced position to open balanced position, or any balanced position in between open and closed.

The plunger has a flow opening at one end (the left end as shown in FIGS. 1 and 2) and a passage port axially through the plunger which allows the system fluid to exert pressure at the plunger flow opening and to flow through the plunger and an operator rod is disposed at the other end of the plunger (the right end as shown in FIGS. 1 and 2) with a passage port axially through and ports radially through the operator rod which allows the system fluid to flow from the passage port of the plunger and valve housing through the passage port of the operator rod and into a balance chamber formed in a piston cylinder disposed at the other end of the operator rod. An annularly enlarged chamber is formed within the valve housing at the outlet port to allow the system fluid to flow through the outlet port when the plunger is in open balanced position and a plurality of plunger flow slots and holes are disposed between the plunger flow opening and body of the plunger and communicate with and allow the system fluid to flow through the outlet port when the plunger is in open balanced position. The plurality of plunger flow slots and holes are known from the prior art.

A piston cylinder tube is perpendicular to and secured to the housing closure plate and extends axially therefrom and is adapted to slidably accept the operator rod and an activator rod for axial reciprocation within the piston cylinder tube. The piston cylinder tube is closed at one end (the left end as shown in FIGS. 1, 2, and 3) by the valve housing closure plate and on the other end (the right end as shown in FIGS. 1, 2, and 3) by a cylinder closure plate which is bored through to slidably accept the actuator rod therethrough.

The operator rod and actuator rod in construction are one rod with a larger diameter at one end (the left end as shown in FIGS. 1, 2, 3, and 5) which forms the operator rod and a reduced diameter at the other end (the right end as shown in FIGS. 1, 2, 3, and 5) which forms the actuator rod. The actuator rod and operator rod are positioned to slide axially for reciprocation within the piston cylinder tube, the inter-diameter of the piston cylinder tube is uniform and has a very slight operating clearance with the external surface of the operator rod. The reduction in diameter of the actuator rod and the inter-diameter of the piston cylinder form a balance chamber at the actuator rod end of the cylinder (the right end as shown in FIGS. 1, 2, 3, and 5) and the operating rod passage port radially through the operator rod extends radially slightly past the juncture of the diameter change of the rod and longitudinally into the actuator rod and radial ports are formed at the end of the operator rod passage port and communicate with the balance chamber and operator rod passage port. In operation the system fluid flows through the plunger and valve housing, through the operator rod passage port, through the radial ports, and into the balance chamber of the piston cylinder tube and applies pressure against a piston cylinder disposed within the piston cylinder tube and base against the external surface of the operator rod at the point of reduced diameter of the actuator rod and balances the pressure exerted by the fluid system on the plunger and holds the plunger in a balanced position continuously. A vent chamber is formed by the tolerance between the external surface of the operator rod and the inter-diameter of the piston cylinder tube and a vent port extends radially through the piston cylinder tube and cooperates with and exhausts the vent chamber on movement of the piston. A retaining nut is disposed on the actuator rod to secure and bias the piston against the operator rod. A housing closure plate seal is disposed at the housing closure plate of the piston cylinder tube to seal the cylinder at one end. Additional seals are disposed between the actuator rod and the cylinder closure plate at the other end of the cylinder to seal the cylinder at that end. The housing plate seal and actuator rod seal and piston seal are commercial items such as Parker Flooromyte Polypaks 2.000×2.500 STD, 1.500× 1.875 STD, and 2.125×2.500 STD, respectively. The diameter of the operator rod and the reduced diameter of the actuator rod are selected so that the balance chamber within the piston cylinder tube is formed of appropriate size to provide the appropriate pressure to balance the entire system and provide for complete and continuous balancing of the plunger in any desired position.

The activator rod extends through the cylinder closure plate and operator means is secured to one end of the actuator rod (the right end as shown in FIGS. 1 and 2) to slidably move the plunger to open and close positions as desired.

Ideally, the inside diameter of the valve housing should be 7⅛" on 4" size, 8½" on 6" size, and 10¾" on 8" size, the interior diameter of the piston cylinder tube should be 2.50 inches, the exterior diameter of the operator rod should be 2.00 inches, and the exterior diameter of the actuator rod should be 1.50 inches, or proportionately, to allow for complete balance and pressure against both ends of the plunger.

Although the invention has been described in preferred form with a certain degree of particularity, it is understood that the present disclosure of the preferred form has been made only by way of example and numerous changes in the details of construction and the combination arrangement of parts may be resorted to without departing from the spirit and scope of the invention as hereinafter claimed.

PARTS LIST 90 is the entire invention;
10 is the valve housing;
11 is the longitudinal opening;
12 is the annular land;
14 is the annular land;
15 is the annularly enlarged chamber;
16 is a disc;
17 is the inlet flange;
18 is the outlet flange;
19 is the inlet port;
22 is the outlet port;
25 is the housing closure plate;
26 is an o-ring seal;
28 is a seal ring;
29 is a seal ring;
30 is a high pressure seal ring;
31 is a high pressure seal;
32 is the operator rod;
33 is the piston cylinder tube;
35 is the plunger;
40 is the operating means;
41 is the plunger flow opening;
42 is the plunger passage port;
43 is the operator rod passage port;
44 are the plunger flow slots and ports;
45 is the radial actuator rod port;
46 is the balance chamber;
47 is the piston;
48 is the piston seal;
49 is the actuator rod seal;
50 is the vent chamber;
51 is the vent port;
52 is the retaining nut;
53 is the housing closure plate seal;
54 is the cylinder closure plate;
55 is the operator rod radial port;
56 is the actuator rod.

What is claimed is:

1. A valve for controlling the flow of liquid under pressure, comprising:

A valve housing, having a longitudinal opening which is closed at both ends, a disc closing the valve housing at one end, inlet and outlet ports communicating with said housing opening at longitudinally spaced places therealong, a valve plunger slidably received within said housing opening and reciprocable axially thereof, said plunger being in the form of a tubular cylinder with a flow opening at one end and cooperating with the flow of liquid through the inlet port and a plurality of flow slots and ports disposed in the defining wall of said plunger and cooperating with the said outlet port, whereby in one position said plunger communication between said inlet and outlet ports is blocked, and in the other plunger position communication between said inlet and outlet ports is effected, a plunger passage port longitudinally through said plunger to allow the flow of liquid through said flow opening, said flow slots and ports, and through said plunger so that the fluid communicates with both ends of said plunger and biases said plunger in any position, a two-ended operator rod with one end extending into said opposite end of said plunger for effecting shifting action of said plunger to selected positions and permitting substantially unrestricted flow of liquid through and out said opposite end of said plunger and out to surround the exterior of said plunger at said opposite end and thereby provide a balancing effect to minimize liquid resistance to plunger shifting action and the other end of said operator rod extending perpendicular to and through a housing plate sealing the opposite end of the valve housing and through a piston cylinder tube disposed axially from said housing closure plate, and said operator rod having a passage port longitudinally through said operator rod and communicating with the passage port of the plunger and the piston cylinder tube and said operator rod having a plurality of radial ports communicating with said operator rod passage port to allow said fluid to flow from said opposite end of said plunger through said radial ports and through said operator rod passage port and cooperating therewith, said housing closure plate disposed at said opposite end of said housing to seal said opposite end of said housing and adapted to slidably accept said operator rod through said housing closure plate, a seal ring and o-ring disposed at said opposite end of said valve housing to seal said housing closure plate and said housing, a pair of circular lands on the inter-wall surface of said valve housing being spaced apart and disposed on opposite sides of said outlet port and cooperating with the exterior surface of said plunger, an annularly enlarged chamber formed in said valve housing between said pair of lands, a pair of seals disposed between said pair of lands and the exterior surface of said plunger to seal and prevent fluid flow from said inlet port to said outlet port except through the cylinder plunger, said piston cylinder tube disposed axially from said housing closure plate having a longitudinal opening of substantially uniform interior diameter along its entire length and closed at one end by said housing closure plate and closed at the opposite end by a cylinder closure plate and said cylinder piston tube adapted to slidably accept said operator rod and an actuator rod reciprocable axially thereof and within said piston cylinder tube, said actuator rod of smaller diameter than said operator rod and at one end extending axially from said opposite end of said operator rod within said piston cylinder tube and extending perpendicular to and through said cylinder closure plate, and providing for said operator rod passage port extending slightly longitudinally into said actuator rod and cooperating with said operator rod passage port, and a plurality of actuator rod radial ports disposed in said actuator rod and cooperating with said operator rod passage port and to allow the flow of fluid continuously through said plunger, said operator rod and said actuator rod and into said piston cylinder tube, a balancing chamber formed within said piston cylinder tube between the exterior surface of said actuator rod and the interior surface of said piston cylinder tube and cooperating with actuator rod radial ports and to allow the flow of fluid into said piston cylinder tube and to communicate with and completely balance the pressure against both ends of the said plunger and to keep said plunger in a balanced condition in any position, a piston disposed at the juncture of said operator rod and said activator rod adapted to slide within said piston cylinder tube and to effect positioning of said plunger, a retaining nut disposed on said actuator rod to bias and secure said piston against said operator rod, a vent chamber disposed between the exterior surface of said operator rod and the interior surface of said piston cylinder tube and a plurality of radial vent ports cooperating with said vent chamber to exhaust air to the atmosphere in the slidable stroke of the said piston, said cylinder closure plate disposed at the opposite end of said cylinder piston tube to seal said cylinder piston tube and bored to slidably accept said actuator rod perpendicularly and through said cylinder closure plate, activator rod seals disposed within said piston cylinder tube at said cylinder closure plate end to seal said cylinder closure plate to said piston cylinder tube, an operator means disposed at the opposite end of said actuator rod to urge said plunger to selected position.

2. The invention of claim 1 wherein the larger diameter of said operating rod and smaller diameter of said actuator rod are predetermined and correlated to provide continuous balance of said plunger in any position.

3. The invention of claim 1 wherein the liquid under pressure may attain a pressure of 6,000 P.S.I.

* * * * *